Dec. 5, 1950  P. R. BELL, JR  2,532,534
SWEEP-VOLTAGE GENERATOR CIRCUIT
Filed June 21, 1946
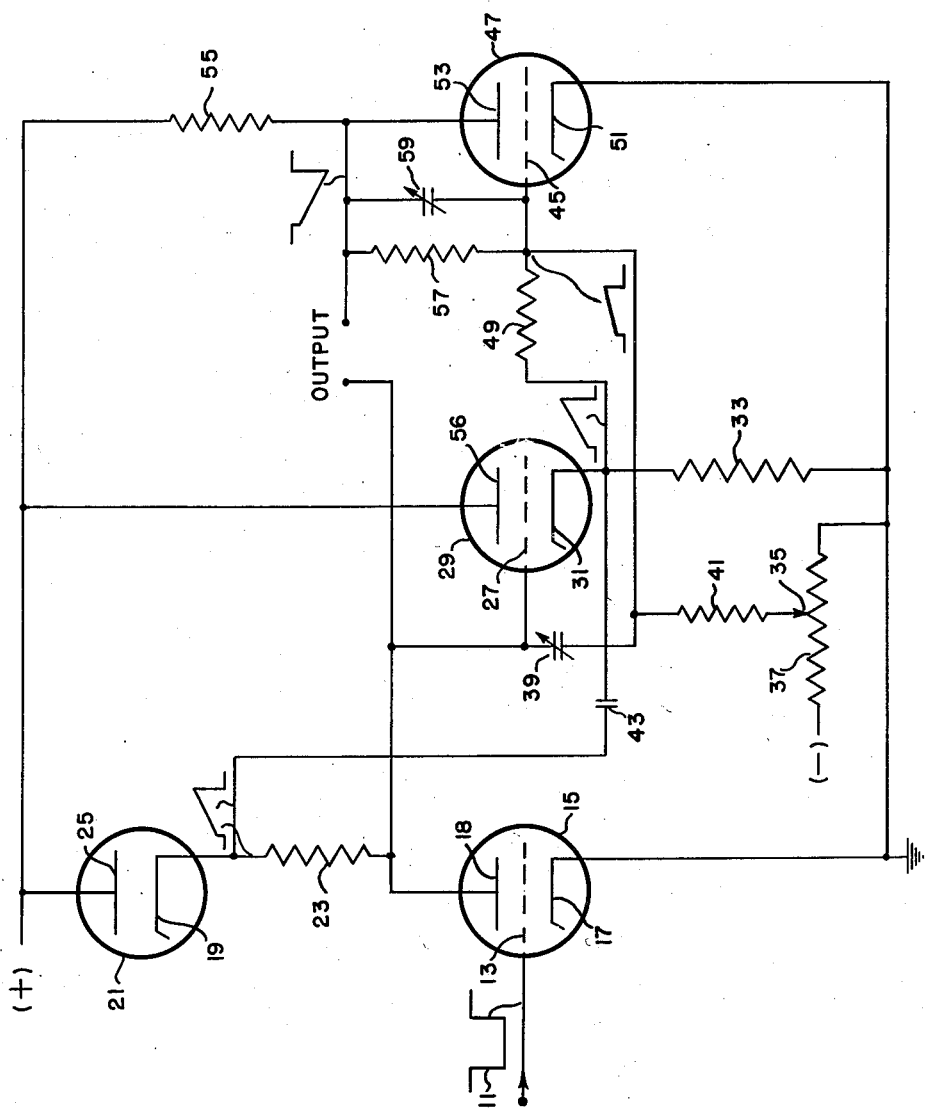
INVENTOR.
PERSA R. BELL JR.
BY
William D. Hall,
ATTORNEY Patented Dec. 5, 1950

2,532,534

UNITED STATES PATENT OFFICE 2,532,534

SWEEP-VOLTAGE GENERATOR CIRCUIT

Persa R. Bell, Jr., Oak Ridge, Tenn., assignor, by mesne assignments, to the United States of America as represented by the Secretary of War Application June 21, 1946, Serial No. 678,224

5 Claims. (Cl. 250—27)

This invention relates in general to electrical circuits, and more particularly, to sweep-voltage generating circuits.

Sweep-voltage generating circuits are most commonly used in conjunction with cathode ray tubes (CRT), the sweep-voltage being applied to one set of deflection plates of the tube, and a test voltage being applied to another set of deflection plates. It is important, then, that the sweep voltage be substantially linear to produce an accurate representation of the test voltage.

It is an object of this invention, therefore, to provide an electrical circuit to produce sweep-voltages for a desired purpose.

It is a further object of this invention to provide a sweep-voltage generating circuit whose output is substantially linear.

It is a still further object of this invention to provide a sweep voltage generating circuit whose output includes two substantially equal sweep voltages of opposite polarity.

In general, this invention utilizes a conventional sweep circuit, a cathode follower circuit, a diode, and a feedback type sweep circuit. The output of the first sweep circuit is applied to the cathode follower circuit and the second sweep circuit. The output of the cathode follower circuit is applied to the diode which is inserted in the plate circuit of the first sweep circuit. The cathode follower circuit output is also applied to the second sweep circuit. The output of the circuit is taken from the plates of the two sweep circuits. The first sweep circuit, the cathode follower circuit, and the diode produce a sweep voltage which is substantially linear. The second sweep circuit produces a sweep voltage of equal and opposite slope.

Other objects, features and advantages of this invention will suggest themselves to those skilled in the art, and will become more apparent from the following description taken in connection with the accompanying drawing in which the sole figure is a schematic circuit diagram of an embodiment of the invention.

Referring now to the drawing, a negative square wave voltage (gate) 11 is applied to grid 13 of vacuum tube 15. Cathode 17 of tube 15 is connected to ground. Anode 18 of tube 15 is connected to cathode 19 of diode 21 through resistor 23. Anode 25 of diode 21 is connected to a source of positive potential (indicated). Anode 18 of tube 15 is connected to grid 27 of vacuum tube 29. Cathode 31 of tube 29 is connected through resistor 33 to ground. Grid 27 of tube 29 is connected to the arm 35 of potentiometer 37 through capacitor 39 (which may be variable) and resistor 41, the capacitor 39 and resistor 41 being connected in series. Potentiometer 37 is connected between a source (indicated) of negative potential and ground. Cathode 31 of tube 29 is coupled to cathode 19 of diode 21 through a large capacitor 43. Cathode 31 of tube 29 is coupled to grid 45 of vacuum tube 47 through resistor 49. Anode 56 of tube 29 is connected to potential source 5. Cathode 51 of tube 47 is connected to ground. Anode 53 of tube 47 is connected to the positive potential source through resistor 55. Anode 53 of tube 47 is connected to grid 45 of tube 47 through resistor 57 and capacitor 59, (which may be variable) the resistor 57 and capacitor 59 being connected in parallel. The junction of capacitor 39 and resistor 41 is connected to grid 45 of tube 47. Output for the circuit is taken at anode 18 of tube 15 and anode 53 of tube 47.

In operation, negative gate 11 is applied to grid 13 which cuts off tube 15. The resultant wave form at anode 18 of tube 15 is, therefore, one of an increasing voltage because of the charging of capacitor 39. This wave form is applied to the cathode follower tube 29 whose output is applied to the cathode 19 of diode 21, the wave form being substantially the same as that at anode 18. An arrangement such as the tubes 15 and 29 and diode 21 is described in the application of William A. Higinbotham, Serial No. 616,377, filed 14 September 1945, which circuit produces a substantially linear sawtooth voltage at anode 18. The voltage at the junction of capacitor 39 and resistors 49 and 41 is applied to the grid 45 of tube 47. Tube 47 is connected in a sweep-voltage generating circuit which employs negative feedback between the anode 53 and grid 45. A positive linear sawtooth voltage applied to the grid 45 will produce a negative sawtooth voltage at the anode 53 which is substantially linear. A somewhat similar feedback sweep circuit is described in the application of Clayton A. Washburn, Serial No. 514,536, filed 16 December 1943. The sweep voltage appearing at cathode 31 will add to the voltage which would be present at the junction of capacitor 39 and resistor 41, in the absence of the second sweep generating circuit. The resulting waveform at the grid 45 will be similar in shape to those on anode 18 and cathodes 19 and 31 but smaller, as the values of the variable resistor and variable capacitors in the two sweep-circuits are varied so as to produce sweep voltages of equal and opposite slope at the anodes 18 and 53.

In practice the capacitors 39 and 59 might be ganged to provide sweep voltages of differing slopes.

While there has been described hereinabove what is at present considered to be a preferred embodiment of this invention, it will be obvious to those skilled in the art that various changes and modifications may be made therein without departing from the scope of the invention as set forth in the appended claims.

What is claimed is:

1. In a sweep-voltage generating circuit, a first vacuum tube comprising at least an anode, a control grid and a cathode connected to ground; means for applying a negative square wave voltage coupled to the grid of said first vacuum tube; a first resistor; a diode comprising an anode and a cathode; means connecting said first resistor between the anode of said first vacuum tube and the diode cathode; means connecting the diode anode to a source of positive potential; a second vacuum tube comprising at least a cathode, a control grid and an anode; means connecting said anode of said first vacuum tube to said control grid of said second vacuum tube; a second resistor; means connecting said cathode of said second vacuum tube to ground through said second resistor; a first capacitor; means connecting said first capacitor between said cathode of said second vacuum tube and the diode cathode; means connecting said anode of said second vacuum tube to a source of positive potential; a third vacuum tube comprising at least a cathode connected to ground, a control grid and an anode; a third resistor; means connecting said third resistor between said anode of said third vacuum tube and a source of positive potential; a fourth resistor; means connecting said fourth resistor between the grid and the anode of said third vacuum tube; a second capacitor; means connecting said second capacitor between the grid and the anode of said third vacuum tube; a third capacitor; a fifth resistor; a potentiometer; means connecting said third capacitor between said anode of said first vacuum tube and said fifth resistor; means connecting said grid of said third vacuum tube to the arm of said potentiometer through said fifth resistor; means connecting said potentiometer between a source of negative potential and ground; a sixth resistor; and means connecting said sixth resistor between said cathode of said second vacuum tube and said grid of said third vacuum tube.

2. A sweep-voltage generating circuit set forth in claim 1, wherein said second and third capacitors are variable.

3. In a sweep-voltage generating circuit, a first vacuum tube sweep-voltage generator responsive to negative input pulses of electrical energy and having grid input and plate output terminals and a grounded cathode; a diode having an anode and a cathode; said anode being coupled to a source of potential that is positive relative to ground, a first resistor coupling said cathode to the output terminal of said first generating circuit; a cathode follower having a grid connected to the output terminal of said first generator; a first capacitive means coupled between the cathode of said cathode follower and the cathode of said diode; a second vacuum tube sweep-voltage generator coupled to and responsive to the output from said cathode follower, having grid input and plate output terminals and a grounded cathode; second capacitive means connected between the plate output terminal of said first generator and the grid input terminal of said second generator; negative biasing means connected to the grid input terminal of second generator; whereby linear sawtooth voltages of opposite polarity are obtained from the plate output terminals of said first and second generators.

4. A sweep-voltage generating circuit as set forth in claim 3, and also including a second resistor in parallel with a third capacitive means and coupled between the grid input and plate output terminals of said second generator, whereby the output sawtooth voltage of said second generator is maintained linear.

5. A sweep-voltage generating circuit as set forth in claim 4, wherein said second and third capacitive means are variable.

PERSA R. BELL, Jr.

REFERENCES CITED

The following references are of record in the file of this patent:

UNITED STATES PATENTS

| Number | Name | Date |
|---|---|---|
| 2,412,485 | Whiteley | Dec. 10, 1946 |
| 2,426,256 | Zemor | Aug. 26, 1947 |
| 2,439,324 | Walker | Apr. 6, 1948 |

OTHER REFERENCES

Principles of Radar, 1946 ed., publ. McGraw-Hill Book Co., pp. 3–16 to 3–26.